INVENTORS
ROBERT SCHMITZ
WILLIAM F. STAHL

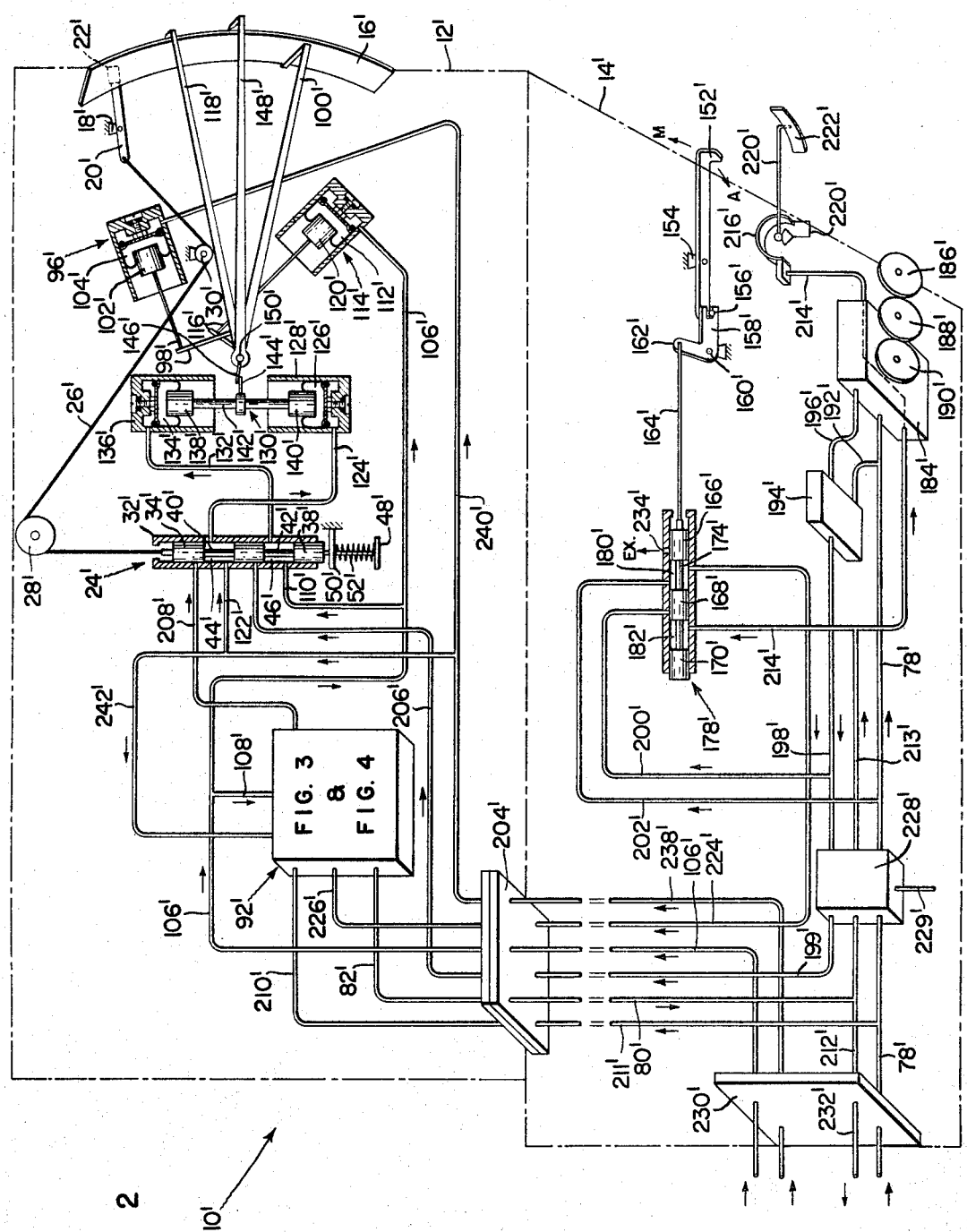

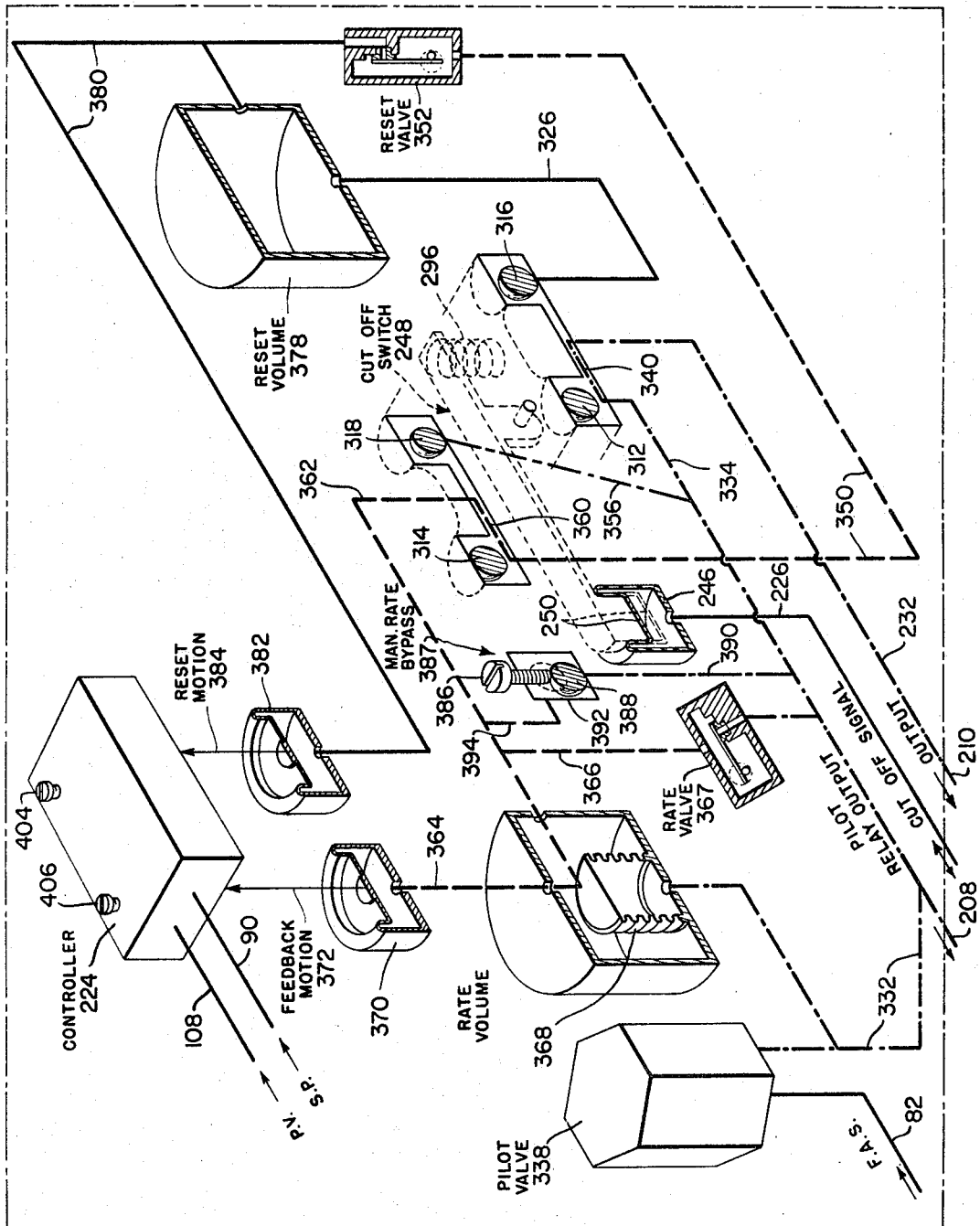

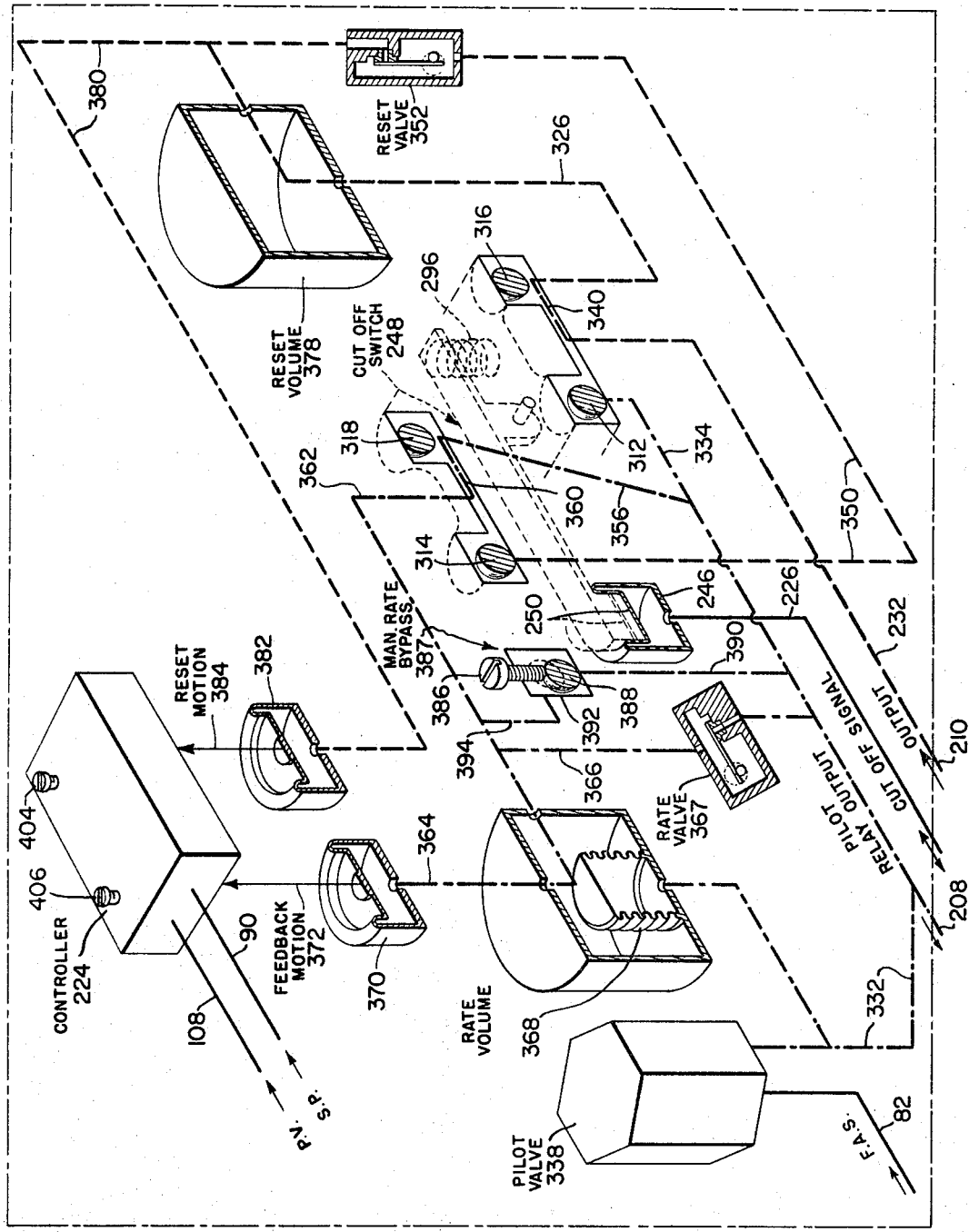

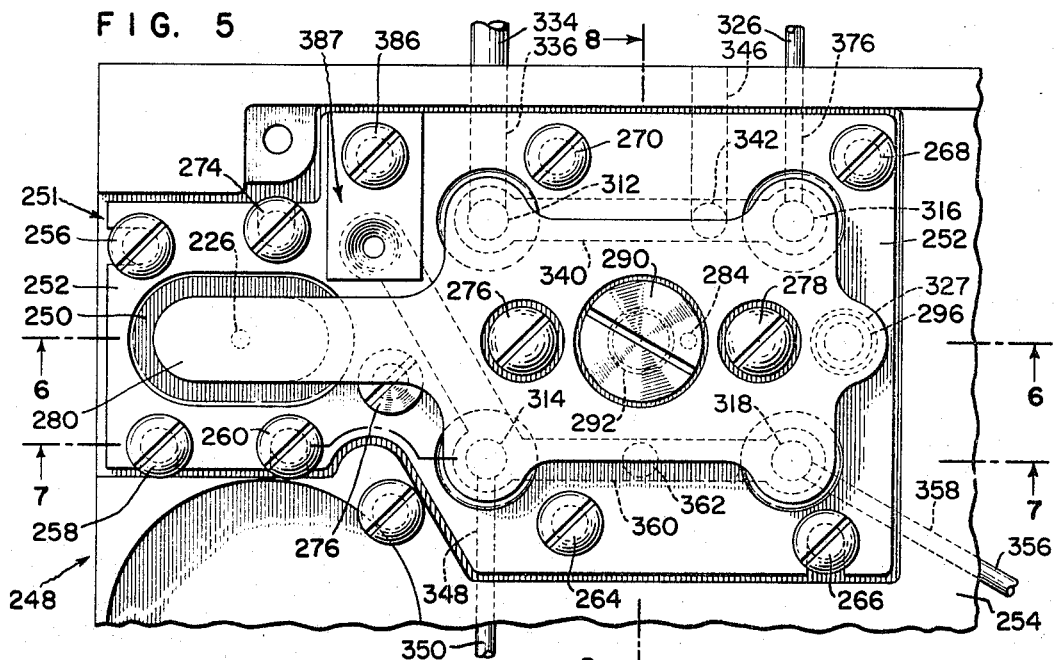
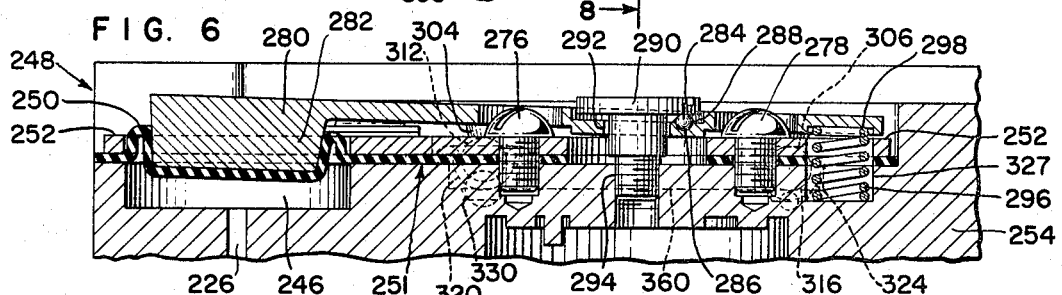
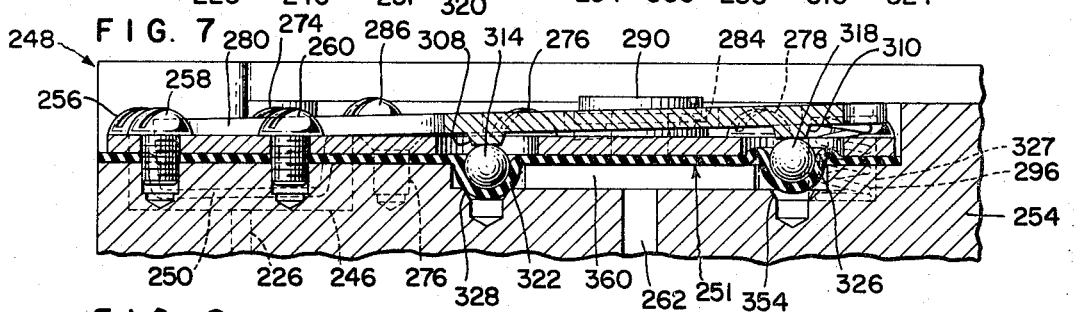
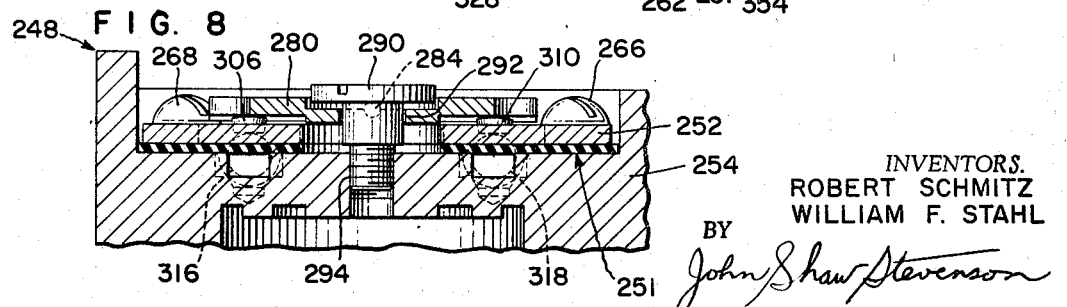

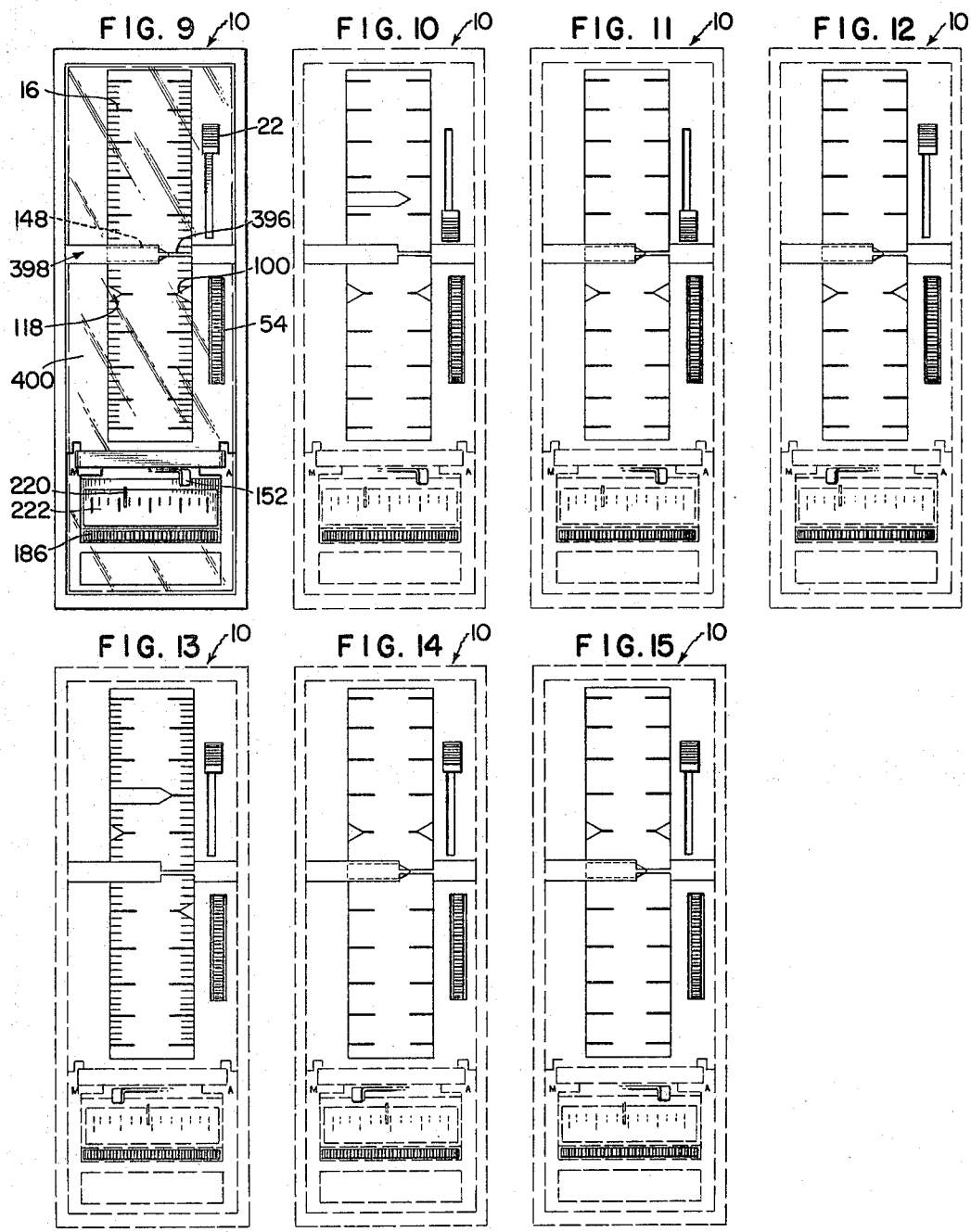

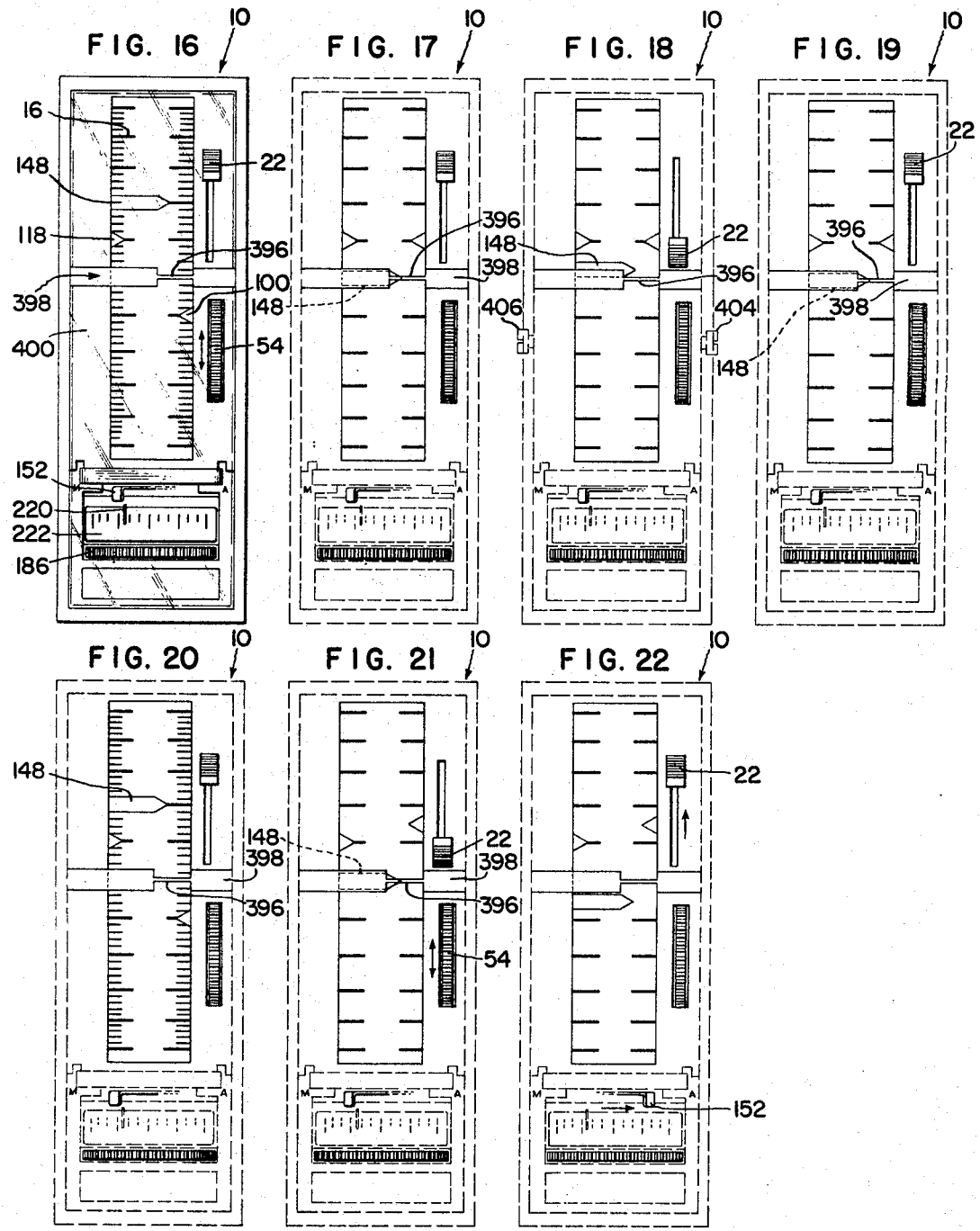

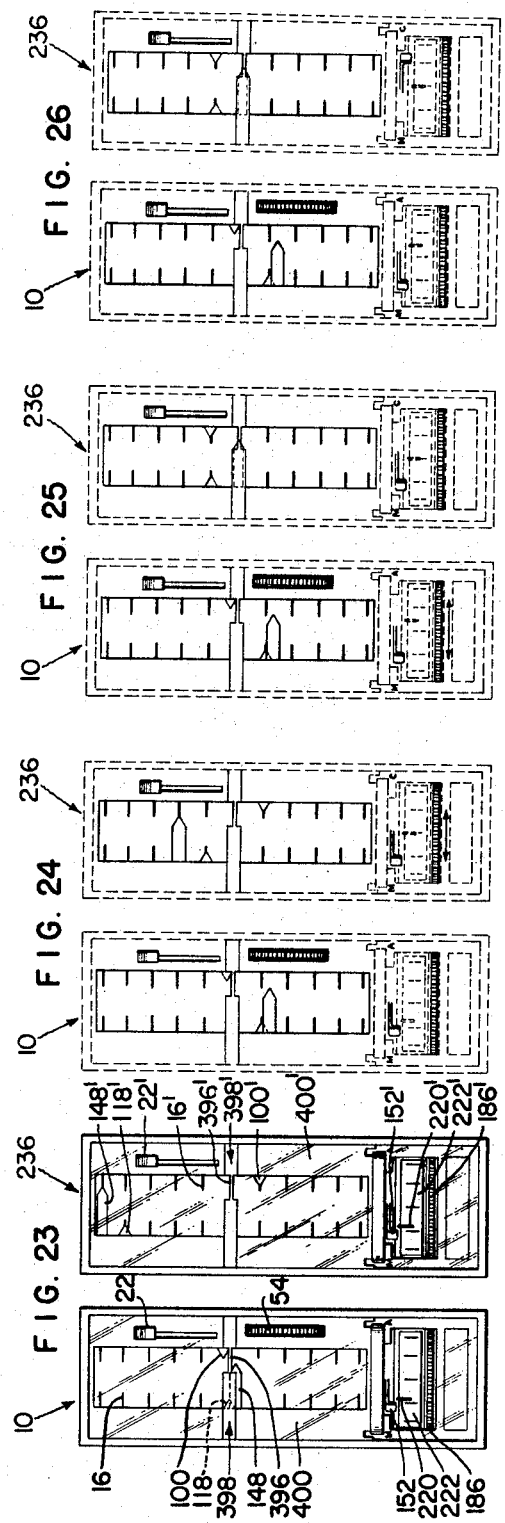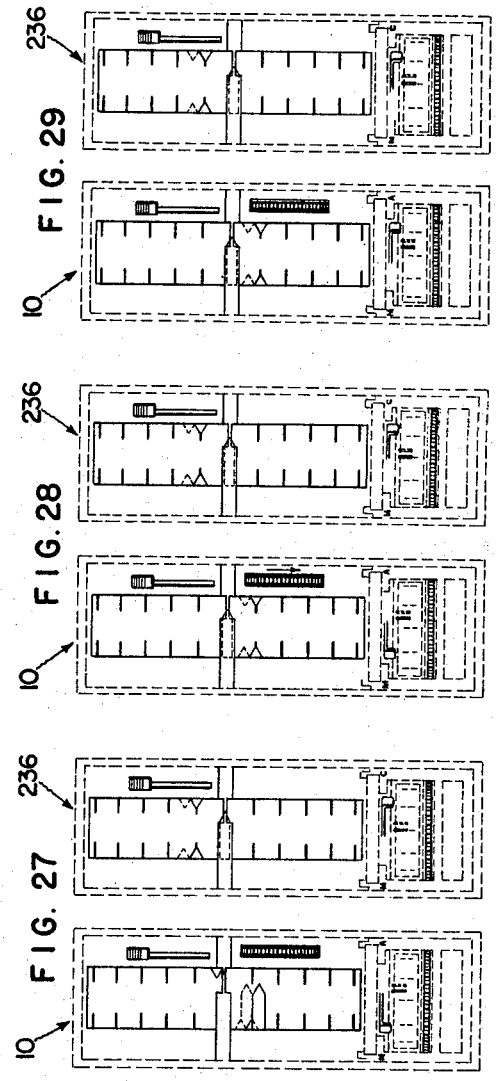

July 2, 1968 R. SCHMITZ ET AL 3,390,697
INDICATING AND CONTROLLING APPARATUS
Filed Oct. 11, 1965 9 Sheets-Sheet 9
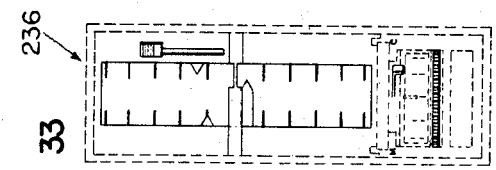
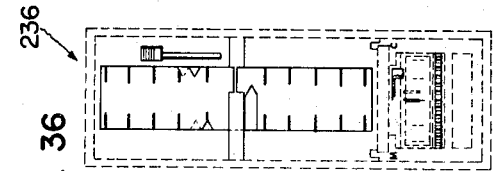
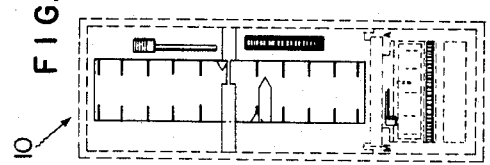
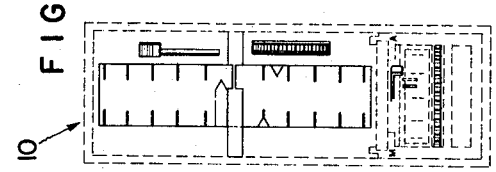
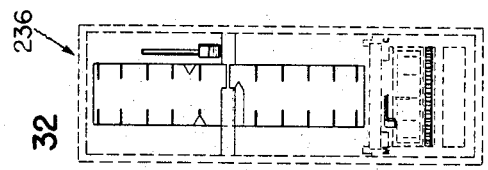
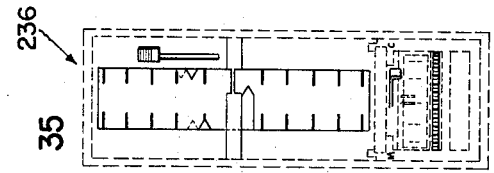
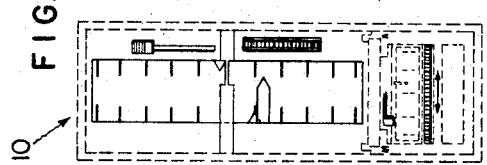
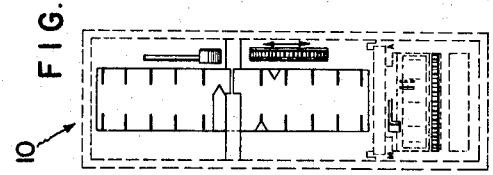
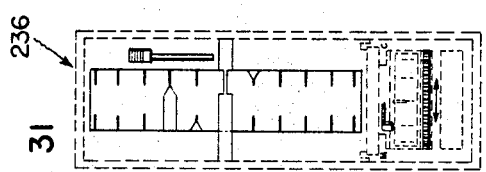
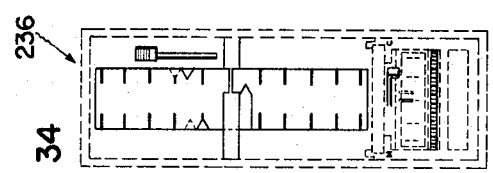
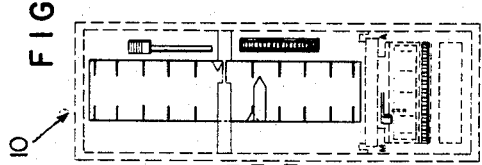
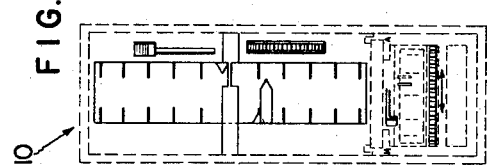
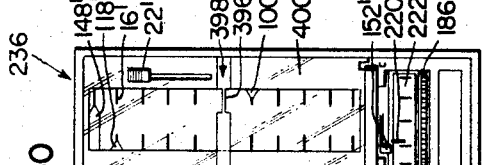
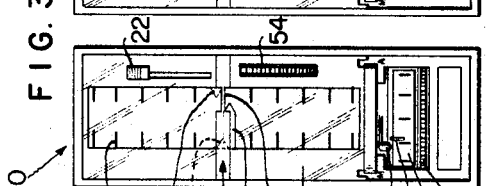
INVENTORS.
ROBERT SCHMITZ
WILLIAM F. STAHL
BY
John Shaw Stevenson
AGENT.

United States Patent Office 3,390,697
Patented July 2, 1968

3,390,697
INDICATING AND CONTROLLING APPARATUS
Robert Schmitz, Hatboro, and William F. Stahl, Warminster, Pa., assignors to Honeywell Inc., Minneapolis, Minn., a corporation of Delaware
Filed Oct. 11, 1965, Ser. No. 494,670
4 Claims. (Cl. 137—557)

It is an object of the present invention to disclose a fluid-actuated thin vertical scale primary indicating-controlling apparatus that can readily be directly shifted between a manually regulated control position and an automatic control position and vice versa without the occurrence of a bump and without being required to pass through a pressure balancing seal position during a time in which the controller has no offset.

It is another object of the present invention to disclose an apparatus of the aforementioned type that is provided with a nulling lever that can be moved vertically along the front face of an indicating portion of the apparatus to a position in which a deviation pointer will show when offset is present in a thin controller module that forms a portion of the apparatus and which will also readily show when this offset is completely removed during a manual reset or zero adjustment of the controller before an associated bumpless switching lever is shifted from a manual control position to an automatic control position.

It is still another object of the invention to disclose an apparatus of the aforementioned type that can effect a bumpless fluid pressure control switching operation between a manual and an automatic control position even under an operating condition in which an offset is present in the controller.

It is another object of the present invention to disclose a fluid-actuated, thin, vertical scale, primary and secondary indicating-controlling apparatus that can readily be directly shifted between a manually regulated control position and a secondary automatic position in which the setpoint can be remotely adjusted or to a cascade control position and vice versa without the occurrence of a bump and without being required to pass through a pressure balancing seal position during a time in which the controller has no offset.

It is another object of the present invention to disclose an apparatus of the aforementioned type that is provided with a vertically positioned nulling lever that can be actuated from the front face of the indicating portion of the primary and secondary indicating-controlling apparatus to a position in which a deviation pointer will show when offset is present in a thin controller module that forms a portion of the apparatus and which will also readily show when this offset is completely removed during a manual reset or zero adjustment of the controller before an associated bumpless switching lever is shifted from a manual control position to the aforementioned secondary automatic control position and/or to a cascade position.

It is still another object of the present invention to disclose an apparatus of the aforementioned type that can effect a bumpless fluid pressure control switching operation between a manual and a secondary automatic control position and/or a cascade position under an operating condition in which offset is present in the controller.

It is another object of the present invention to disclose a fluid-actuated thin vertical scale primary and secondary indicating-controlling apparatus that can readily be directly shifted between a manually regulated control position and a secondary automatic setpoint adjusting control position or a cascade control position and vice versa without the occurrence of a bump and without being required to pass through a pressure balancing sealed position during a time in which the controller has no offset.

It is still another object of the present invention to disclose an apparatus of the aforementioned type that is provided with a nulling lever that can be moved vertically along the front face of the indicating portion of the primary and secondary indicating-controlling apparatus to a position in which a deviation pointer will show when offset is present in a thin controller module that forms a portion of the apparatus and which will also readily show when this offset is completely removed while making a manual reset or a zero adjustment in the controller while the bumpless switching lever is shifted from a manual control position to the aforementioned secondary automatic control position and then to a cascade position.

It is still another object of the invention to disclose a bumpless switching apparatus of the aforementioned type that can effect a bumpless fluid pressure control switch between a manual and a secondary automatic control position and a cascade position even under an operating condition in which offset is present in the controller.

It is another object of the present invention to provide a cut-out switch for the aforementioned control system that has selected inlet and outlet ports that are closed by means of a spring-biased lever that applies a force to solid spheres which, in turn, apply this force to associated dimples formed in a flexible diaphragm to force these portions of the diaphragm against two selected pairs of the aforementioned ports and which closed ports can be opened by raising the fluid pressure within these closed ports.

It is another object of the present invention to provide a unique solid sphere and dimpled diaphragm construction of the aforementioned type that provides soft seats and whose construction also allows the valve to be always self-centered into alignment with its associated ports.

It is another object of the present invention to disclose not only a cut-off switch which blocks the output of the controller pilot valve and which simultaneously allows the manual regulator pressure to bypass the reset valve to allow the manually regulated valve pressure to go into the reset chamber to eliminate any lag from the reset valve, but which also simultaneously bypasses the rate valve and isolates the rate section of the controller from the reset section so that any lag from the rate valve that is present in the system when shifting between manual-to-automatic and manual-to-cascade will be eliminated.

Because the pressure in the rate or reset chamber often is not equal to the controller output pressure after a manual-to-automatic or manual-to-cascade switch has taken place, the controller is placed in an unbalanced condition and the pressure in the rate or reset pressure chamber begins to change and that change, in turn, slowly causes the controller output pressure to change in an undesired manner.

It is thus another object of the invention to solve this problem by disclosing a cut-off switch construction of the aforementioned type that will prevent the introduction of undesired output signal changes from occurring after a manual-to-automatic or manual-to-cascade switching operation has taken place.

A better understanding of the present invention may be had from the following detailed description when read in connection with the accompanying drawings in which:

FIGURE 1 shows a fluid-actuated, vertical scale, primary indicating-controlling apparatus which can be shifted between a manual and automatic and between an automatic and manual switching position without a bump;

FIGURE 2 discloses an additional, secondary, fluid-actuated, vertical scale indicating-controlling apparatus which, together with the primary apparatus disclosed in FIGURE 1, is employed to bumplessly switch not only back and forth between a manual-automatic switching position, but also between these positions and a cascade position;

FIGURE 3 shows in detail form the fluid pressure connections between the controller and cut-off switching unit of the indicating and controlling apparatus that is shown in FIGURES 1 and 2 after this apparatus has been switched to an automatic control position;

FIGURE 4 shows in detail form the fluid pressure connections between the controller and cut-off switching unit of the indicating-controlling apparatus that is shown in FIGURES 1 and 2 after this apparatus has been switched to a manual control position;

FIGURE 5 shows a plan view of a cut-off switch that is employed in the aforementioned apparatus shown in FIGURES 3 and 4;

FIGURE 6 is a cross-sectional view of the cut-off switch in its automatic "A" control position taken along section line 5—5 of FIGURE 5;

FIGURE 7 shows another cross-sectional view of the cut-off switch in its manual "M" control position taken along section line 7—7 of FIGURE 5;

FIGURE 8 shows still another sectional view of the cut-off switch in its automatic control position taken along line 8—8 of FIGURE 5;

FIGURE 9 is a view showing the position in which the deviation setpoint and process variable pointers, spring return vertically positioned null and manual-to-automatic switching levers, setpoint and manually adjusted thumb wheel will be located on the face of the primary indicating-controlling apparatus shown in FIGURE 1 when this apparatus is in an automatic control position;

FIGURE 10 shows that the first step in bumplessly shifting from automatic to a manual regulator position is to align the deviation indicating pointer with a thin line portion of a fixed index band by pulling down the spring return nulling lever and adjusting the horizontally positioned manual adjustable thumb wheel;

FIGURE 11 shows the desired zero deviation position that the deviation pointer will be in with respect to the thin line portion of the index band when the aforementioned lever and thumb wheel adjustments have been completed;

FIGURE 12 shows the previously pulled down nulling lever in a released spring returned up position and the horizontally positioned, manually operated switch lever shifted to its manual control position "M" and the final position that the primary indicating-controlling apparatus will be in at the incident of time when the bumpless switch from automatic to manual control is completed;

FIGURE 13 is a view to illustrate how a setpoint-process variable pointer deviation condition can be corrected when the primary indicating-controlling apparatus is on manual control and manual control is being effected by rotation of the horizontally positioned, manually adjustable thumb wheel;

FIGURE 14 shows that the first step in bumplessly switching from manual to automatic control position is to align the deviation indicating pointer with a thin line portion of the fixed index band by adjusting the vertically positioned, manually adjusted thumb wheel when no offset exists in the controller;

FIGURE 15 shows the horizontally positioned, manually operated switching lever shifted to its automatic control position "A" and the final position that the primary indicating-controlling apparatus will be in at the incident of time when the bumpless shift from manual to automatic control is completed;

FIGURE 16 shows that the first operation required to eliminate offset in the controller portion of the primary indicating-controlling apparatus shown in FIGURE 1 while the control remains on manual control is to adjust the vertically positioned thumb wheel;

FIGURE 17 shows that the deviation pointer will be aligned with a thin line portion of the stationary index band as a result of the last-mentioned thumb wheel adjustment;

Figure 1:
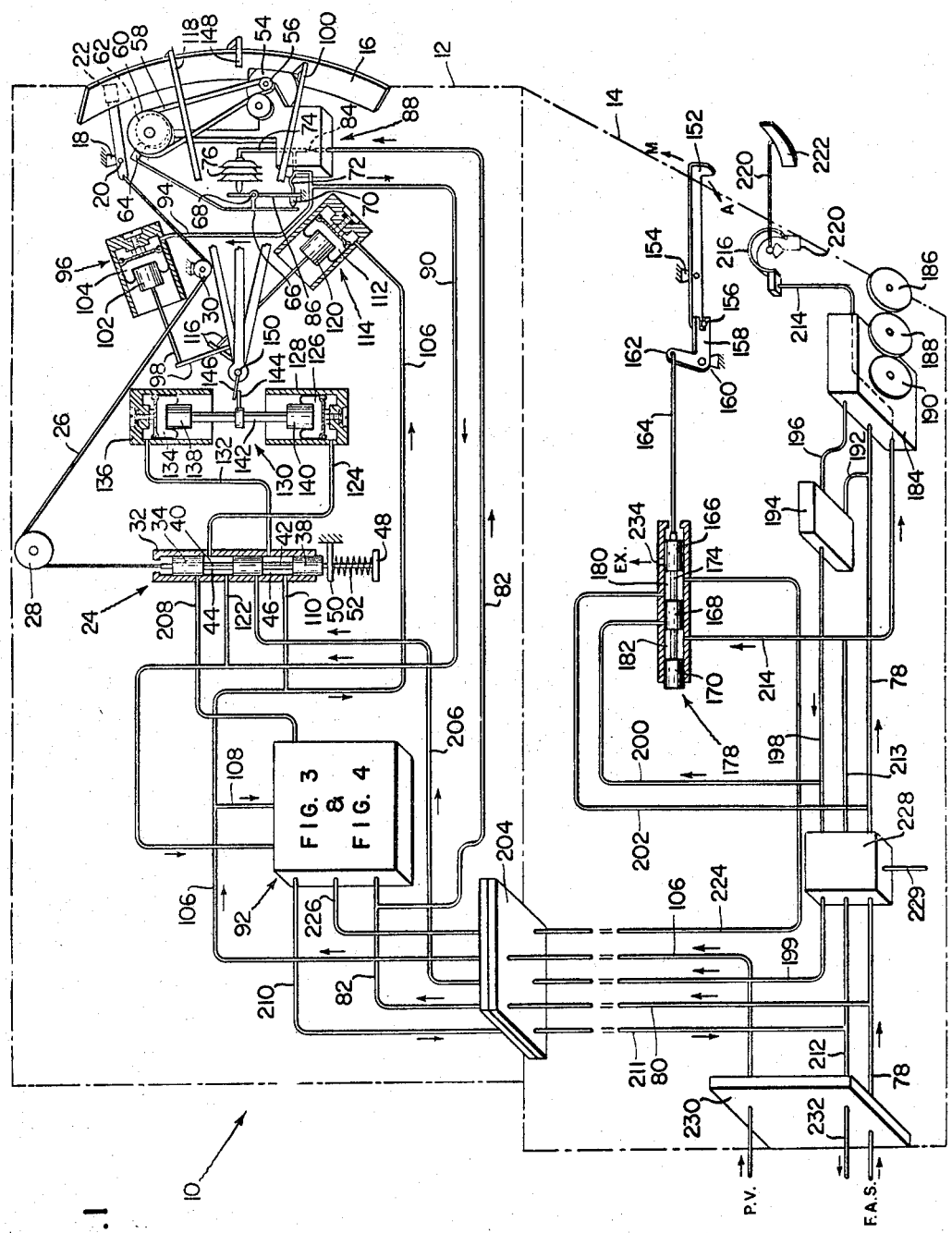

FIGURE 18 shows the vertically positioned nulling lever in a pulled-down position, the amount of controller offset or the amount of the deviation pointer's displacement from the thin line portion of the stationary index band while the nulling lever is in this pulled-down position and the adjusting screws on the opposite sides of the controller are adjusted to eliminate the offset in the controller;

FIGURE 19 shows the vertically positioned nulling lever in a released spring returned up position and in a no controller offset condition after the aforementioned screws have been adjusted to eliminate this offset;

FIGURE 20 shows the primary indicating-controlling apparatus of FIGURE 1 in a manual control position and the deviation pointer out of alignment with the thin line portion of the stationary index band;

FIGURE 21 shows the vertically positioned lever in a pulled-down position and the vertically positioned thumb wheel adjusted to align the deviation pointer with the thin line portion of the stationary index band and to, therefore, make the output signal of the controller containing offset equal to the level of the fluid pressure manually produced by the adjustment of a fluid pressure regulator;

FIGURE 22 shows a manual-to-automatic, horizontally positioned transfer lever moved to its automatic position and further shows the amount of control offset still remaining in the controller while the aforementioned bumpless switching from manual to automatic operation is effected in going from the lever, pointer and thumb wheel positions shown in FIGURES 18–20;

FIGURE 23 is a view showing the position in which the nulling, setpoint, process variable pointers, the vertically positioned nulling setpoint manual-to-automatic and manual-to-cascade switching levers and the manually adjustable thumb wheels will be located on the face of the primary and secondary indicating-controlling apparatus shown in FIGURE 2 when this apparatus is in a manual position and the controllers have zero offset;

FIGURE 24 shows the first step in bumplessly switching from manual to a cascade position is to adjust the horizontally positioned thumb wheel of the secondary controller to give desired process variable value;

FIGURE 25 shows the desired zero deviation position that the deviation pointer of the secondary indicating controller will be in with respect to the thin portion of its associated stationary index band after the horizontal thumb wheel of the primary controller has been manually adjusted;

FIGURE 26 shows the horizontally positioned, manually operated switching lever of the secondary indicating controller shifted to a cascade position "C" which provides secondary automatic control with remote setpoint;

FIGURE 27 shows in solid-line form the horizontal thumb wheel of the primary indicating controller of FIGURE 2 being adjusted while it is in a secondary automatic or FIGURE 24 position and an alternative lined-out, dotted-line setpoint process variable pointer position to which the secondary indicating controller can be adjusted if desired while it is in this position by adjusting the vertically positioned setpoint thumb wheel;

FIGURE 28 shows the desired zero deviation position that the deviation pointer of the primary indicating controller will be in with respect to a thin portion of its associated stationary index band after the vertical thumb wheel adjustment of the primary controller has been manually adjusted and the dotted-line position of the secondary indicating controller setpoint and process variable pointer represents the alternative position for these pointers referred to under the description of FIGURE 25;

FIGURE 29 shows the horizontally positioned, manually operated switching lever of the primary indicating controller shifted to an automatic position "A" and a dotted-line position of the secondary indicating controller setpoint and process variable pointers representing the alternative positions for these pointers referred to under the description of FIGURE 25 and the system is in cascade control;

FIGURE 30 to FIGURE 36 disclose how controls similar to those disclosed in FIGURES 23–29 can be bumplessly switched when offset is present in the controllers.

The fluid-actuated vertical scale primary indicating-controlling apparatus 10 disclosed in FIGURE 1 is mounted on an upper panel plate 12 and a lower panel plate 14.

The upper panel plate 12 supports an indicating scale 16 and a stationary support member 18 which carries a pivot 20 on which the nulling lever 22 is mounted. The top end of a multispool type nulling switch 24 is shown connected to one end of a flexible cord 26. The cord 26, in turn, is shown wrapped about pulleys 28, 30 and has its other end attached to the left end of the nulling lever 22 for movement therewith.

The nulling switch 24 is comprised of a cylindrical casing 32 containing three cylindrical spools 34, 36, 38 joined together by the shaft portions 40, 42. A first chamber 44 is shown formed between the shaft portion 40 and the inner wall of casing 32 and a second chamber 46 is formed between the shaft portion 42 and the inner wall of casing 32.

An inverted T-shaped member 48 is shown extending slidably through a stationary member 50 from the spool 38 through a stationary member and a spring 52 is employed to retain the spools 34, 36, 38 of the nulling switch 24 in the position shown in FIGURE 1 or a position in which the nulling lever 22 is in a non-depressed position.

The upper plate 12 also has mounted thereon a knurled setpoint adjusting disc 54 and a driving pulley 56 fixedly attached for rotation therewith. A belt 58 is shown connecting the driving pulley 56 and a driven pulley 60. A cam 62 is shown mounted for rotation with pulley 60. A follower 64 having a flapper 66 extending therefrom is shown mounted on a movable pivot 68 so that the rotation of the disc 54 in one direction will move the flapper toward the nozzle 70 and rotation of the disc in an opposite direction will move the flapper away from the nozzle 70.

A flexible tube 72 is shown connecting the nozzle 70 by way of a conduit 74 to the interior of the stacked diaphragm feedback chamber 76.

A filtered air supply line (F.A.S.) under pressure, is applied from a source not shown by way of conduit 78, 80, 82 and restriction 84 to the bleed nozzle chamber 70.

When the disc 54 is turned in the direction to move the flapper 66 toward the nozzle 70 the pressure therein will increase and it will be applied to the feedback diaphragm capsule unit 76. The feedback force unit 76, in turn, will apply a force to the upper end of the flexible leaf spring pivot 86 that will move the floating pivot 68 and the flapper 66 attached thereto away from the nozzle to a force balance position.

The setpoint pressure established by the aforementioned disc 54 adjustment of the parts forming the trasmitter 88 is applied by the setpoint pressure transmitting conduit 90 to the controller and cut-off switching unit 92 which will be hereinafter described under the description of FIGURES 3 and 4. Another branch 94 of the conduit 90 applies the setpoint pressure to the fluid-actuated setpoint rolling diaphragm receiver 96. A suitable bell crank linkage 98 connected to the setpoint indicating arm and pointer 100 is actuated by the piston 102 of the setpoint receiver as the magnitude of the setpoint pressure applied to the chamber 104 changes.

An inflowing process variable pressure PV is applied by way of a conduit 106 and branch conduit 108 to the controller and cut-off switching unit 92. Conduit 106 also has a branch conduit at 110 that is connected to the chamber 46 of the nulling switch 24. The conduit 106 is also connected to the chamber 112 of a process variable pressure receiver 114. A suitable bell crank linkage 116 which is connected for movement with a process variable indicator arm and pointer 118 is actuated by the piston 120 of the process variable receiver 114 as the magnitude of the setpoint pressure applied to the chamber 112 changes.

The setpoint pressure produced in conduit 90 is applied by way of a branch conduit 122 to the chamber 44 of a nulling switch 24 and thence by way of the conduit 124 to a chamber 126 of a fluid pressure actuated deviation receiver 128 which forms a first part of a deviation indicating arm and pointer actuator 130. As previously mentioned, the inflowing process variable pressure PV is applied by way of the conduit 106, 110 to the chamber 46 of the nulling switch 24. FIGURE 1 also shows the conduit 132 for applying the process variable PV pressure in the chamber 46 to a chamber 134 of a second portion of the fluid pressure actuated deviation receiver 136 which forms the second part of the aforementioned deviation indicating arm and pointer actuator 130.

As the magnitude of the aforementioned setpoint SP and process variable PV pressures in chambers 126, 134 change the position of the rolling diaphragm contacting pistons 138, 140 and their connecting rod 142 will be simultaneously moved in an upward or downward direction an amount that will be the result of the differences of the magnitude of the SP and PV pressures.

This change in position of the connecting rod 142 is, in turn, transmitted by means of a protuberance 144 to another protuberance 146 in contact therewith that extends from the left end of the deviation indicator arm pointer 148 that is pivotally mounted on the pivot shaft 150.

The lower panel plate 14 is provided with a transfer switch lever 152 shown in its solid-line automatic or "A" position and in broken-line fashion for its manual "M" position.

This transfer switch lever 152 is shown pivotally mounted on a stationary support member 154 between its ends and pivotally connected by means of a pin and slide connection 156 to the bell crank link 158. The bell crank link 158 is, in turn, pivotally mounted as shown on a stationary support member 160. The left end of the bell crank link 160 is connected for joint pivotal movement at 162 with the right end of the link 164. The left end of the link 164, in turn, is shown fixedly connected for movement with cylindrical spools 166, 168, 170 shown positioned within a casing 172 which are joined together by the piston rod portions 174, 176 of an automatic-manual ("A" to "M") transfer switch 178.

A first chamber 180 is shown formed between shaft portion 174 and the inner wall of the casing 172 and a second chamber 182 is formed between the shaft portion 176 and the inner wall of the casing 172. The spools 166, 168, 170 will thus be in the position shown in FIGURE 1 when the transfer switch 178 is in the automatic "A" control position.

FIGURE 1 also shows a conventional pressure regulator 184 whose fluid pressure output is selectively increased or decreased manually by rotating the gear wheel 186 associated with gear train 188, 190 in the respective clockwise of counter-clockwise direction.

The filtered air supply (F.A.S.) under pressure is fed through the conduit 78 to the pressure regulator 184 and by way of its branch conduit 192 to a booster 194 that is employed to amplify the fluid pressure that the regulator applies to it by way of conduit 196. The amplified output fluid pressure from the booster 194, in turn, is applied by way of conduit 198 and branch conduit 200 and is shown dead-ended by spool 168 at the transfer switch 178. A branch 202 of the filtered air supply (F.A.S.) conduit 78 applies this fluid pressure to chamber 180 of the transfer switch 178. The output pressure from the booster 194 is applied to conduit 198, the branch conduit 199, the quick disconnect unit 204, conduit 206 and as shown dead-ended by spool 36 of the nulling switch 24.

The output fluid controlled pressure produced by the controller and cut-off switching unit 92 is applied to conduit 208 and is shown dead-ended by spool 34 of the nulling switch 24. The last-mentioned fluid control pressure is also applied by way of transmitting conduits 210, 211, 212, 213 and 214 to a chamber 182 of the transfer switch 178, and simultaneously by way of the other end of the conduit 214 through the regulator 184 to the Bourdon 216. The Bourdon 216, in turn, is connected by a suitable bell crank linkage 218 to move lever 220 along the control valve indicating scale 222.

Conduit 224, quick disconnect unit 204, and conduit 226 are employed to transmit a fluid pressure supply in chamber 180 as a cut-off signal to the cut-off switch and controller unit 92.

A relief valve which may be of a conventional spring type is employed to exhaust the controller output pressure in conduit 212 to atmosphere by way of exhaust 229 in the event that the filtered air supply pressure in the F.A.S. conduit 78 is lost.

When a shift from an automatic "A" to manual "M" position shown in FIGURE 1 takes place by moving the actuating lever 152 of the transfer switch 178, the spools 166, 168, 170 are thereby moved to the right of the position shown in FIGURE 1, it can be seen that the output fluid pressure signal being produced by the manually adjusted regulator 184 will then be applied by way of the conduits 198, 200 and the transfer valve 178 to the output conduits 214, 213, 212, the manifold 230, conduit 232 and to an automatically regulated fluid control valve, not shown.

In this manner, the automatically regulated fluid pressure control signal being applied to the control valve by the controller and cut-off switching unit 92 will be cut off. Under this manual "M" position the filtered air supply (F.A.S.) will be dead-ended against the spool 168 and the pressure in the cut-off signal line 224 exhausted to atmosphere by way of the automatic-manual transfer switch chamber and exhaust port 234.

When the right end of the nulling lever 22 is manually depressed, the flexible cable 26 will be pulled and moved about the pulleys 30, 28 in a direction that will raise the spool 34, 36, 38 of the nulling switch 24 from the position shown.

When the nulling lever 22 is actuated in this manner during a shift to manual, the pressure signal forming the process variable (PV) in conduit 132 will be disconnected from the process variable signal in the conduit 110 and instead will be connected to the conduit 206 containing the manually adjusted pressure signal generated by the adjusting wheel 186 of the pressure regulator 184.

Another change that takes place during the shift of the nulling lever to a manually depressed position is that the setpoint pressure signal and conduit 124 will be disconnected from the setpoint (SP) pressure applied in conduit 122 and the output signal of the controller and cut-off switch unit will instead be connected to the conduit 124 by way of the nulling switch 24.

The secondary indicating apparatus 236 shown in FIGURE 2 is employed when it is desired to use the automatic-to-manual primary controlling and cut-off switching apparatus of FIGURE 1 in a cascade system.

It can be seen that the only difference that exists between the primary indicating-controlling apparatus 10 shown in FIGURE 1 and the secondary indicating-controlling apparatus 236 shown in FIGURE 2 is the elimination of the manually adjusted setpoint pressure signal adjusting transmitter 88 of FIGURE 1 and the addition of a conduit 238, 240, 242 to transmit the output control signal of FIGURE 1 to the receiver 96 so that this control signal can be used in a manner similar to the way the setpoint signal was employed in the setpoint receiver 96 of FIGURE 1.

FIGURE 3 shows the flow diagram for the controller and cut-off switch 92 shown in FIGURES 1 and 2 when the controlling-indicating apparatus is in an automatic control position. The controller unit 244 is preferably of a motion balancing ring type which is disclosed in the Robert Schmitz patent application, Ser. No. 403,228, filed on Oct. 12, 1964. It should be understood, however, that controllers other than the motion balancing ring type shown in the Schmitz application noted supra may be employed beneficially for use with the controlling indicators 10 and 236 disclosed in FIGURES 1 and 2.

The conduit 226 as shown in FIGURES 5, 6 and in the automatic control position in FIGURE 3 is connected to a diaphragm capsule 246 of the cut-off switch 248 of the controller and cut-off switch unit 92. Under this condition, the preformed flexible portion 250 of the diaphragm 251 will be raised by the pressure of the cut-off signal applied thereto from the dotted-line position to the solid-line position. This action takes place while internal and external edges of the diaphragm are retained in position by the punched-out plate 252 that is retained in a fixed position on the manifold plate 254 by means of the screw connections 256–278.

FIGURE 6 shows an arm 280 having an embossed portion 282 that is retained in contact with the flexible portion 250 of the diaphragm 251.

An upper surface portion of the arm 280 to the right of the embossed portion 282 is shown in FIGURE 6 having the lower surface of a sphere 284 fixedly retained in a semi-circular dimpled portion 286 thereof by means of a suitable welding material 288.

A flat head screw 290 is shown passing through a cylindrical slotted wall portion 292 in the arm 280 and retained in fixed engagement with the manifold plate 254 by means of a screw connection 294. A flat portion of the undersurface of the flat head of the screw 290 is shown retained in point contact with the upper surface of the sphere 284 by means of a spring 286 which applies a spring force in an upward direction to a cupped-out portion 298 of the right end of the arm 280. Apertures 300, 302 are also formed in the arm to prevent the head of their respective diaphragm-retained screw connections 276, 278 from interfering with the seesaw pivotal action of the arm 280 which takes place when a cut-off fluid pressure signal is transmitted by way of conduit 226 to chamber 246. This action moves the cupped-shaped portion 250 of the diaphragm 251 from its dotted-line manual control "M" position as shown in FIGURES 4 and 7 to its solid-line automatic "A" position shown in FIGURES 3, 5 and 8.

The arm 280 shown in FIGURES 6–8 has four embossed portions 304, 306, 308, 310 protruding from its lower surface and in contact with their associated spheres 312, 314, 316, 318. Each of these spheres 312–318 is, in turn, shown in contact with semi-circular dimples 320, 322, 324, 326 formed in the diaphragm 251.

The four (4) dimples 320, 322, 324, 326 in the diaphragm 251 and the spheres 312, 314, 316, 318 associated therewith together with the spherical ball pivot 284 about which the actuating arm 280 associated with these spheres is rotated provide a unique self-aligning soft seat valve construction. This is so because the flat plane portion of the arm 280 can be tilted laterally or longitudinally on the spherical fulcrum 284. Another feature is that, since the top of the coil spring 296 is retained in the cupped portion 298 of the arm 280 and a cup portion 327 in the manifold 254, there is no possibility for the arm 280 and its associated spherical fulcrum 284 to rotate about the screw head 290.

When the controlling-indicating apparatus 10 of FIGURE 1 is on manual control, the output fluid pressure from the regulator 184 and its associated booster 194 that is being transmitted to the controller cut-off switch unit 92 will be exhausted to atmospheric pressure by way of exhaust port 234 in the automatic-manual transfer switch 178 shown in FIGURE 1.

Under a manual control condition, the cut-off fluid pressure in conduit 224 and 226 of the diaphragm capsule chamber 246 of the cut-off switch 248 in the controller cut-off switching unit 92 will thus be exhausted to atmosphere and the capsule 250 will be moved by the action of the spring 296 acting on the arm to the solid-line position shown in FIGURE 4 or to the dotted-line position shown in FIGURE 7 of the drawing. Under this manual control condition, the sphere 284 fixed to the arm 280 will act as a fulcrum about which the arm is pivoted to the aforementioned manual "M" position as shown in FIGURE 7. In this position, the spheres 312, 314 will be forced by the associated portions 304, 308 of the arm 380 against the dimples 320, 322 that are associated with these spheres to seal off the ports 328, 330. Under this condition, the fluid pressure being transmitted by way of conduit 332, 334 as shown in FIGURE 4 and thence through conduit 336 of the FIGURE 5 from the pilot relay 338 of the controller 224 will be cut off by the dimple valve 312, 320 from the cut-off switch passageway 340, 342, 346. This fluid pressure is also cut off from being applied to the manual regulator output control conduit 232 associated with the regulator 184.

When the sphere 314-dimple 322 valve is moved by arm 282 to seal off the part 328, the passageway 344 in cut-off switch 248 of FIGURE 5 and the extension thereof 350 extending to the reset valve 352 will be sealed off and the lag introduced into the control system by this reset valve is eliminated.

When the sphere 318 is in the open manual "M" control position shown in FIGURE 7, the port 354 will be open by the fluid pressure output of the pilot relay 338 that is then allowed to flow directly by way of conduit 332, 334, 356, 358, port 354, passageway 360, 362, 364, 366 to the rate valve unit 367 containing a bellows 368 and to the feedback capsule unit 370 to apply a mechanical feedback motion 372 to the controller 224 in the direction of the arrows.

When the sphere 316 in FIGURE 8 is moved from the closed position shown to an open manual control position of FIGURE 7, the open port 374 will allow the output pressure to the control valve being applied by adjustment of the regulator 184 in FIGURE 1 to also be applied by way of the conduit 232 of FIGURE 4, passageways 346, 342, 344, 374 and directly by way of passageway 376 to the reset volume chamber 378 and thence by way of conduit 380 to the reset capsule 382.

The reset capsule, in turn, is constructed to apply a mechanical reset motion 384 to the controller 224. In the aforementioned described manner it can be seen that the reset valve 352 that introduced its lag into the control system while on automatic has been bypassed and eliminated when in manual control.

When the controller is placed in automatic, the introduction of the cut-off signal into the chamber 246 will cause the arm 280 to be tilted so that the spheres 312, 314 and dimples 320, 322 will be moved off of their respective seats 330, 328 and the spheres 316 and 318 will be moved into closed engagement with their associated ports 324, 326. When the automatic shift is completed, the cut-off switch 248 will be in the position as shown in the FIGURE 3 automatic control "A" position.

Because the rate valve 367 and reset valve 352 are isolated from one another in the aforementioned manner, when the controller is on manual a bumpless shift can be made from manual to automatic "A" or manual "M" to cascade "C" and without the output of the controller changing after this shift is made.

A manual rate bypass screw 386 shown in FIGURE 5 can be employed as shown in detail in FIGURES 3 and 4 in the valve unit 387 to allow a spherical valve 388 to be moved away from its solid-line closed valve position in which the fluid cannot be bypassed about the rate valve to a dotted-line position in which the fluid can be bypassed through the conduit 390, valve chamber 392, conduit 394 around the rate valve 367.

It should be noted that all of the parts disclosed in FIGURE 2 that have prime markings added to the parts identified by the same reference numerals in FIGURE 1 are identical to and function in the same manner as those parts that have previously been described and disclosed in FIGURE 1.

AUTOMATIC - TO - MANUAL AND MANUAL - TO - AUTOMATIC WITH NO OFFSET IN THE CONTROLLER (FIGURES 9 TO 15)

FIGURE 9 is a view showing the position in which the deviation pointer 148, setpointer 100, process variable 118, spring returned vertically positioned nulling lever 22, manual-to-automatic transfer switching lever 152, the manually adjustable setpoint adjusted thumb wheel 54, the manual regulator adjusted thumb wheel 186, will be located on the face of the primary indicating-controlling apparatus 10 shown in FIGURE 1 when this apparatus 10 is in an automatic control position "A."

FIGURE 10 shows that the first step in bumpless shifting from automatic "A" to the manual regulator position "M" is to align the deviation indicating pointer 148 with a thin line portion 396 of a fixed opaque index band 398 that forms a part of the curved front clear plastic face 400 that is in front of the indicating scale 16 (FIG. 1) and which is shown mounted in the frame 402 that supports the panel plate 12 by pulling down the spring return nulling lever 22 and adjusting the horizontally positioned manual adjustable thumb wheel 186 to perform the aforementioned alignment.

FIGURE 11 shows the desired zero deviation position that the deviation pointer 148 will be in with respect to the thin line portion 396 of the index band 398 when the aforementioned lever and thumb wheel 186 adjustments of FIGURE 10 have been completed.

FIGURE 12 shows the previously pulled down nulling lever 22 in a released spring returned, up position and the horizontally positioned, manually operated switch lever 152 shifted to its manual control position "M" and the final position that the primary indicating-controlling apparatus 10 will be in at the incident of time when the bumpless switch from automatic "A" to manual "M" control is completed.

FIGURE 13 is a view to illustrate how a setpoint pointer 100, process variable pointer 118 deviation condition can be corrected when the primary indicating-controlling appaartus 10 is on manual control "M" and manual control is being effected by rotation of the horizontally positioned, manually adjustable thumb wheel 186.

FIGURE 14 shows that the first step in bumplessly switching from manual "M" to automatic "A" control position is to align the deviation indicating pointer 148 with a thin line portion 396 of the fixed index band 398 by adjusting the vertically positioned, manually adjusted thumb wheel 54 when no offset exists in the controller.

FIGURE 15 shows the horizontally positioned, manually operated switching lever 152 shifted to its automatic control position "A" and the final position that the primary indicating-controlling apparatus 10 will be at the incident of time when the bumpless shift from manual "M" to automatic "A" control is completed.

REMOVING OFFSET OR ALIGNING THE CONTROLLER WHILE STILL ON MANUAL (FIGURES 16–19)

FIGURE 16 shows that the first operation required to eliminate offset in the controller portion of the primary indicating and controlling apparatus 10 shown in FIGURE 1 while the control remains on manual control is to adjust the vertically positioned thumb wheel 54.

FIGURE 17 shows that the deviation pointer 148 will be aligned with a thin line portion 396 of the stationary index band 398 as a result of the last-mentioned thumb wheel 54 adjustment.

FIGURE 18 shows the vertically positioned nulling lever 22 in a pulled-down position, the amount of controller offset or the amount of the deviation pointer's displacement from the thin line portion 396 of the stationary index band 398 while the nulling lever is in this pulled-down position and the suitable conventional adjusting screws 404, 406 on the opposite sides of the controller are adjusted to eliminate the offset in the controller.

FIGURE 19 shows the vertically positioned nulling lever in a released spring returned up position and in a no controller offset condition after the aforementioned screws have been adjusted to eliminate this offset.

BUMPLESS SWITCH FROM MANUAL "M" TO AUTOMATIC "A" WITH CONTROLLER HAVING OFFSET (FIGURES 20–22)

FIGURE 20 shows the primary indicating-controlling apparatus 10 of FIGURE 1 in a manual control "M" position and the deviation pointer 148 out of alignment with the thin line portion 396 of the stationary index band 398.

FIGURE 21 shows the vertically positioned nulling lever 22 in a pulled-down position and the vertically positioned thumb wheel 54 adjusted to align the deviation pointer 148 with the thin line portion 396 of the stationary index band 398 and to, therefore, make the output signal of the controller 10 containing offset equal to the level of the fluid pressure manually produced by the adjustment of a fluid pressure regulator 184.

FIGURE 22 shows a manual-to-automatic, horizontally positioned transfer lever 152 moved to its automatic "A" position and further shows the amount of control offset still remaining in the controller while the aforementioned bumpless switching from manual "M" to automatic "A" operation is effected in going from the lever, pointer and thumb wheel positions shown in FIGURES 20–22.

CONTROLLERS WITH NO OFFSET (FIGURES 23–29)

FIGURE 23 is a view showing the position in which the nulling, setpoint, process variable pointers 22, 100, 118, 22', 100', 118', the vertically positioned nulling setpoint manual-to-automatic and manual-to-cascade switching levers 152, 152' and the manually adjustable thumb wheels 186, 186', 54 will be located on the face of the primary and secondary indicating-controlling apparatus 10, 236 shown in FIGURE 2 when this apparatus is in a manual position and the controllers have zero offset.

FIGURE 24 shows the first step in bumplessly switching from manual "M" to a cascade "C" position is to adjust the horizontally positioned thumb wheel 186 of the secondary controller 236 to give the desired process variable value.

FIGURE 25 shows the desired zero deviation position that the deviation pointer 148' of the secondary indicating controller will be in with respect to the thin portion 396' of its associated opaque stationary index band 398' after the horizontal thumb wheel 186 of the primary controller 10 has been manually adjusted.

FIGURE 26 shows the horizontally positioned, manually operated switching lever 152' of the secondary indicating controller shifted to a cascade position "C" which provides secondary automatic control 236 with remote setpoint.

FIGURE 27 shows in solid-line form the horizontal thumb wheel 186 of the primary indicating controller 10 of FIGURE 1 being adjusted while it is in a secondary automatic position and an alternative lined-out, dotted-line setpoint process variable pointer position $100^1$, 118' to which the secondary indicating controller 236 can be adjusted if desired while it is in this position by adjusting the vertically positioned setpoint thumb wheel 54.

FIGURE 28 shows the desired zero deviation position that the deviation pointer 148 of the primary indicating controller 10 will be in with respect to a thin portion 396 of its associated stationary index band 398 after the vertical thumb wheel adjustment 54 of the primary controller 10 has been manually adjusted and the dotted-line position of the secondary indicating controller setpoint and process variable pointers 100', $118^1$ represent the alternative position for these pointers.

FIGURE 29 shows the horizontally positioned, manually operated switching lever 152 of the primary indicating controller 10 shifted to an automatic position "A" and a dotted-line position of the secondary indicating controller setpoint and process variable pointers representing the alternative positions for these pointers and the system is in cascade "C" control.

CONTROLLERS WITH OFFSET (FIGURES 30–36)

FIGURE 30 is the same as that described under FIGURE 23.

FIGURE 31 is the same as that described under FIGURE 24.

FIGURE 32 differs from 25 in that the nulling lever 221 is pulled down similar to the manner previously described under FIGURE 21.

FIGURE 33 is similar to the description of FIGURE 26, except that it shows offset.

FIGURE 34 is similar to the description of FIGURE 27, except that it shows offset.

FIGURE 35 differs from FIGURE 28 in that the nulling lever 22 of the primary controlling apparatus 10 is pulled down for the same purpose as that described under FIGURE 21.

FIGURE 36 shows the controllers with offset and now switched in the same unique bumpless manner while in cascade "C" in the same manner as that disclosed in FIGURES 20–22.

FIGURES 30–36 thus show that, even though a controller has offset, it is for the first time able to be as bumplessly switched with the apparatus disclosed herein while in cascade as a controller containing no offset such as was disclosed in FIGURE 29.

From the aforementioned description, it can be seen that a bumpless switching controlling apparatus has been disclosed that has a unique manually operated pull-down spring return nulling or deviation lever actuating means and a unique, compact, soft seated, self-centering cut-off switch to directly, and without passing through a sealed position, be bumplessly switched from automatic "A" to manual "M" control and vice versa or from manual to either a secondary automatic control position or to a cascade control position "C" no matter whether "offset" or "no offset" is present in the controlling apparatus.

Another feature inherent in the aforementioned bumpless switching apparatus is that the pressure actuated cut-off switch can be moved to a position that will bypass the reset and rate valves during a shift from automatic to manual so that any inequality in the magnitude of the fluid pressure that existed in the rate and reset chambers versus the controller output pressure that is present after the switch has taken place cannot introduce lag into the control system.

What is claimed is:

1. In an apparatus for bumplessly switching a controlling apparatus from an automatic control condition to a manual control condition, comprising an indicating scale, a first pointer to indicate the magnitude of a setpoint pressure on the scale, a second pointer to indicate the magnitude of a process variable pressure on the scale, a transparent face spaced from the scale containing a single intermittent wide and narrow opaque index line marking thereon, a deviation pointer to indicate the deviation from the narrow portion of the index line marking existing between the magnitude of the setpoint pressure and the process variable pressure, a deviation pointer actuator having opposing setpoint and process variable signal receiving chambers, a nulling switch, a nulling switch actuating lever means having a portion protruding from the transparent face, the nulling switch having means connected to receive and transmit the setpoint and process variable pressure signals to their respective aforementioned opposing receiving chambers when the lever means is in a normal non-actuated position and to instead receive and transmit a manually regulated pressure and an output pressure of the controlling apparatus to the aforementioned opposite receiving chambers before a bumpless switch to a manual controlling condition is affected when the nulling switch actuating lever is retained in a normally depressed position.

2. The apparatus defined in claim 1 wherein a rotatably adjustable thumb wheel protrudes from the face that is positioned in front of the scale, the wheel being operably connected to adjust the magnitude of a manually regulated pressure to a value that is equal to the magnitude of the output pressure of the controlling apparatus while the nulling switch actuating lever is retained in the manually depressed condition and to thereby effect a movement of a point portion of the deviation pointer into alignment with the narrow portion of the opaque index line marking on the transparent face to thereby effect a bumpless switch from a manual control condition to an automatic control condition.

3. In an apparatus for bumplessly switching a controlling apparatus containing a non-desired off-set inherent in the controller from a first control condition to another, comprising an indicating scale, a first pointer to indicate the magnitude of a setpoint pressure on the scale, a second pointer to indicate the magnitude of a process variable pressure on the scale, a transparent face spaced from the scale containing a single intermittent wide and narrow opaque index line marking thereon, a deviation pointer to indicate the deviation from the narrow portion of the index line marking existing between the magnitude of the setpoint pressure and the process variable pressure, a deviation pointer actuator having opposing setpoint and process variable signal receiving chambers, a nulling switch, a nulling switch actuating lever means having a portion protruding from the transparent face, the nulling switch having means connected to receive and transmit the setpoint and process variable pressure signals to their respective opposite receiving chambers when the lever means is in a normal non-actuated position and to instead receive and transmit a regulated pressure and an output pressure of the controlling apparatus to the aforementioned opposite receiving chambers before a bumpless switch between the first control condition and the other control condition is affected when the nulling switch actuating lever is retained in a manually depressed position.

4. The apparatus for bumplessly switching a controlling apparatus as defined in claim 3 wherein the depression on the lever provides an opportunity to make a zero adjustment to eliminate offset from the controlling apparatus and to simultaneously visually align the deviation pointer with the narrow portion of the opaque index line.

References Cited
UNITED STATES PATENTS

| | | | |
|---|---|---|---|
| 2,731,023 | 1/1956 | Panich et al. | 137—82 |
| 3,025,868 | 3/1962 | Jaquith et al. | 137—85 |
| 3,208,465 | 9/1965 | Virbila | 137—85 |

HENRY T. KLINKSIEK, *Primary Examiner.*